(12) United States Patent
Howard et al.

(10) Patent No.: US 8,146,362 B2
(45) Date of Patent: Apr. 3, 2012

(54) OTEC SYSTEM

(75) Inventors: Robert James Howard, Clifton, VA (US); Nicholas J. Nagurny, Manassas, VA (US); Laurie E. Meyer, Hamilton, VA (US); John W. Rapp, Manassas, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 552 days.

(21) Appl. No.: 12/328,656

(22) Filed: Dec. 4, 2008

(65) Prior Publication Data
US 2010/0139271 A1 Jun. 10, 2010

(51) Int. Cl.
F03G 7/04 (2006.01)
F03G 7/06 (2006.01)
F03G 7/08 (2006.01)
F03B 17/02 (2006.01)

(52) U.S. Cl. .......... 60/641.7; 60/641.6; 60/496; 290/1 R (58) Field of Classification Search .................... 60/398, 60/641.7, 495, 496, 497, 501; 62/260; 114/331; 290/1 R
See application file for complete search history.

(56) References Cited

U.S. PATENT DOCUMENTS

| | | | |
|---|---|---|---|
| 3,715,885 A | 2/1973 | Schur | |
| 3,896,622 A * | 7/1975 | Daniello | 60/641.7 |
| 3,995,160 A | 11/1976 | Zener et al. | |
| 4,027,479 A | 6/1977 | Cory | |
| 4,166,363 A | 9/1979 | Mougin | |
| 4,170,878 A | 10/1979 | Jahnig | |
| 4,233,813 A | 11/1980 | Simmons | |
| 4,266,500 A * | 5/1981 | Jurca | 114/333 |
| 4,281,514 A | 8/1981 | Egerer | |
| 4,325,216 A | 4/1982 | Mermis | |
| 4,327,552 A | 5/1982 | Dukess | |
| 4,350,014 A | 9/1982 | Sanchez et al. | |
| 4,355,513 A | 10/1982 | Girden | |
| 4,627,240 A * | 12/1986 | Holmes | 60/507 |
| 5,291,847 A | 3/1994 | Webb | |
| 5,303,552 A | 4/1994 | Webb | |
| 5,685,147 A | 11/1997 | Brassea | |

OTHER PUBLICATIONS

Jack Jones and Yi Chao, "Mechanics/Machinery", "NASA Tech Briefs", Jan. 2009, pp. 50-52, Publisher: NASA , Published in: US.

* cited by examiner

Primary Examiner — Thomas Denion
Assistant Examiner — Christopher Jetton
(74) Attorney, Agent, or Firm — DeMont & Breyer, LLC (57) ABSTRACT

An Ocean Thermal Energy Conversion (OTEC) system comprising a self-contained submersible OTEC plant is disclosed. The OTEC plant comprises a electrical generation system and a thermal mass whose temperature is based on the temperature of water at a first depth of a body of water. The OTEC plant is moved to a second depth of the body of water, wherein water at the second depth is a different temperature that the water at the first depth. The OTEC system generates electrical energy based on a difference in the temperatures of the water at the second depth and the temperature of the thermal mass. The OTEC system is able to generate electrical energy at either of the first depth and the second depth.

25 Claims, 8 Drawing Sheets

OTEC SYSTEM

FIELD OF THE INVENTION

The present invention relates to power generation in general, and, more particularly, to ocean thermal energy conversion.

BACKGROUND OF THE INVENTION

Non-petroleum-based energy generation is an area of high technical and political interest. Systems that produce energy without the combustion of petroleum products potentially offer alternatives to conventional energy generation plants that are renewable, cleaner, potentially cheaper, and potentially more reliable.

Ocean thermal energy conversion (OTEC) is one such promising energy technology. An OTEC system converts solar radiation to electrical energy by using a naturally occurring temperature difference between water at the surface of a large body of water and water thousands of meters deep to drive a power-producing cycle. As long as the temperature between the warm surface water and the cold deep water differs by about 20° C., an OTEC system can produce a significant amount of power. Large bodies of water, such as oceans, therefore, represent vast renewable energy resources, which can be relatively easy to access.

A typical conventional OTEC system uses an electrical generation system, which is located at the surface and produces electrical energy using the temperature differential between two heat exchangers. A first heat exchanger uses the heat from warm surface water to vaporize a fluid contained in a closed-loop conduit. The energy of the vaporized fluid is used to turn a turbine, which turns an electrical generator that generates electrical energy. After the vaporized fluid passes through the turbine, it is channeled by the conduit to the second heat exchanger. The second heat exchanger uses cold water piped up from the depths of the body of water to condense the vapor back into the liquid state. The cold water received by the second heat exchanger is typically pumped up to it from a depth of 1000-2000 meters. The water is pumped to the heat exchanger through a cold water pipe that extends from the surface of the ocean to the deep water level. Another pump then pumps the working fluid back to the first heat exchanger where the cycle begins again.

Although a promising technology, to date, the use of OTEC power generation has been limited by a number of technical challenges. First, the significant amount of energy required to run an OTEC plant reduces its overall benefits. Second, conventional OTEC plants are highly susceptible to damaging winds, waves, and hurricanes and other storms. Finally, an OTEC plant requires complex and expensive infrastructure to enable its deployment.

SUMMARY OF THE INVENTION

The present invention provides an OTEC system that comprises a self-contained, submersible, OTEC plant. The OTEC plant includes an electrical generation system and a chamber for containing a bulk thermal mass. The OTEC plant is movable between a first depth of a body of water, having a first temperature, and a second depth of the body of water, having a second temperature that is different than the first temperature. White the OTEC plant is at the first depth, the thermal mass attains a temperature based on the water at the first depth. When the OTEC plant moves from the first depth to the second depth, the OTEC plant insulates and transports the thermal mass, in bulk, along with it. As a result, when the OTEC plant is positioned at the second depth, the thermal mass can provide a local heat sink/source that can be thermally coupled to the electrical generation system. Thus, the need to pump water from one depth to the other, through a long water conduit, is obviated. Further, in some embodiments, the OTEC plant is reconfigurable so that can generate electrical energy while positioned at either depth.

Like the prior art, the present invention enables the generation of electrical energy based on the temperature differential provided to an OTEC plant. In the prior art, this temperature differential is provided by pumping water from each of a shallow depth and a deep depth of a body of water to the OTEC plant located at the surface of the body of water. In the prior art, water from the deep level is drawn to the platform through a large diameter, very long conduit. This deep water conduit is typically more than 1000 meters long (i.e., from the platform at the surface to the deep water region).

In contrast to the prior art, the present invention does not require a long water conduit to draw water between a first depth and a second depth in order to provide a temperature differential to an OTEC plant. Instead, the present invention provides an OTEC plant that moves between the two depths and carries with it a thermal mass whose temperature is based on the temperature of water at one of the depths. For example, while at the first depth, the OTEC plant is thermally coupled to water at the first depth and the thermal mass whose temperature is based on water at the second depth. In similar fashion, while at the second depth, the OTEC plant is thermally coupled to water at the second depth and the thermal mass whose temperature is based on water at the first depth. If the temperature of the water at the second depth is lower than the temperature of the water at the first depth, then the thermal mass acts as the local heat source and the water at the second depth acts as a local heat sink. If the temperature of the water at the second depth is higher than the temperature of the water at the first depth, then the thermal mass acts as the local heat sink and the water at the second depth acts as a local heat source. In either case, since the distance between the thermal mass and the water at the depth of operation is short, a long conduit to draw water between the first depth and second depth is not required.

In some embodiments, the electrical generation system comprises a Rankine-cycle engine and a turbogenerator. When the OTEC plant is located at a deep water level, a valve system enables a flow of working fluid from a first heat exchanger, which is thermally coupled with the thermal mass, to a turbogenerator to a second heat exchanger, which is thermally coupled with water from the deep water level. The first heat exchanger is relatively warmer than the second heat exchanger by virtue of the fact that the temperature of the thermal mass is based on water at a shallow level, which is warmer than water at the deep water level. As a result, the working fluid is vaporized at the first heat exchanger and condensed at the second heat exchanger. When the OTEC plant is located at a shallow water level, the valve system enables a flow of working fluid from the second heat exchanger to the turbogenerator to the first heat exchanger. At the shallow water level, the second heat exchanger is relatively warmer than the first heat exchanger by virtue of the fact that the temperature of the thermal mass is based on water at a deep water level, which is cooler than water at the shallow water level. As a result, the working fluid is vaporized at the second heat exchanger and condensed at the first heat exchanger.

In some embodiments, the thermal mass comprises a phase-change material, such as a clathrate compound. In some embodiments, the thermal mass comprises a clathrate compound that has a freezing point higher than the temperature of the water at the deep level region. In some of these embodiments, the present invention derives advantage from the fact that the buoyancy of the clathrate compound becomes more positive when it freezes. As a result, little or no energy is required to raise an OTEC plant containing a clathrate compound-based thermal mass from a deep water region to a shallower depth.

In some embodiments, the thermal mass is a volume of water taken into the chamber while the OTEC plant is at one of the depths.

In some embodiments, the electrical generation system comprises a solid-state thermoelectric device.

An embodiment of the present invention comprises: a generator, wherein the generator generates electrical energy based on a temperature difference between a first thermal mass and a second thermal mass; the first thermal mass, wherein the temperature of the first thermal mass is based on the temperature of water at a first depth of a body of water; the second thermal mass, wherein the temperature of the second thermal mass is based on the temperature of water at a second depth of the body of water; and a chamber, wherein the chamber contains the second thermal mass; wherein each of the chamber and the generator are movable between the first depth and the second depth, and wherein the generator comprises a first physical adaptation that enables the generator to operate at each of the first depth and the second depth.

DETAILED DESCRIPTION

The following terms are defined for use in this Specification, including the appended claims:

Physically-connected means in direct, physical contact and affixed (e.g., a mirror that is mounted on a linear-motor).

Figure 1:
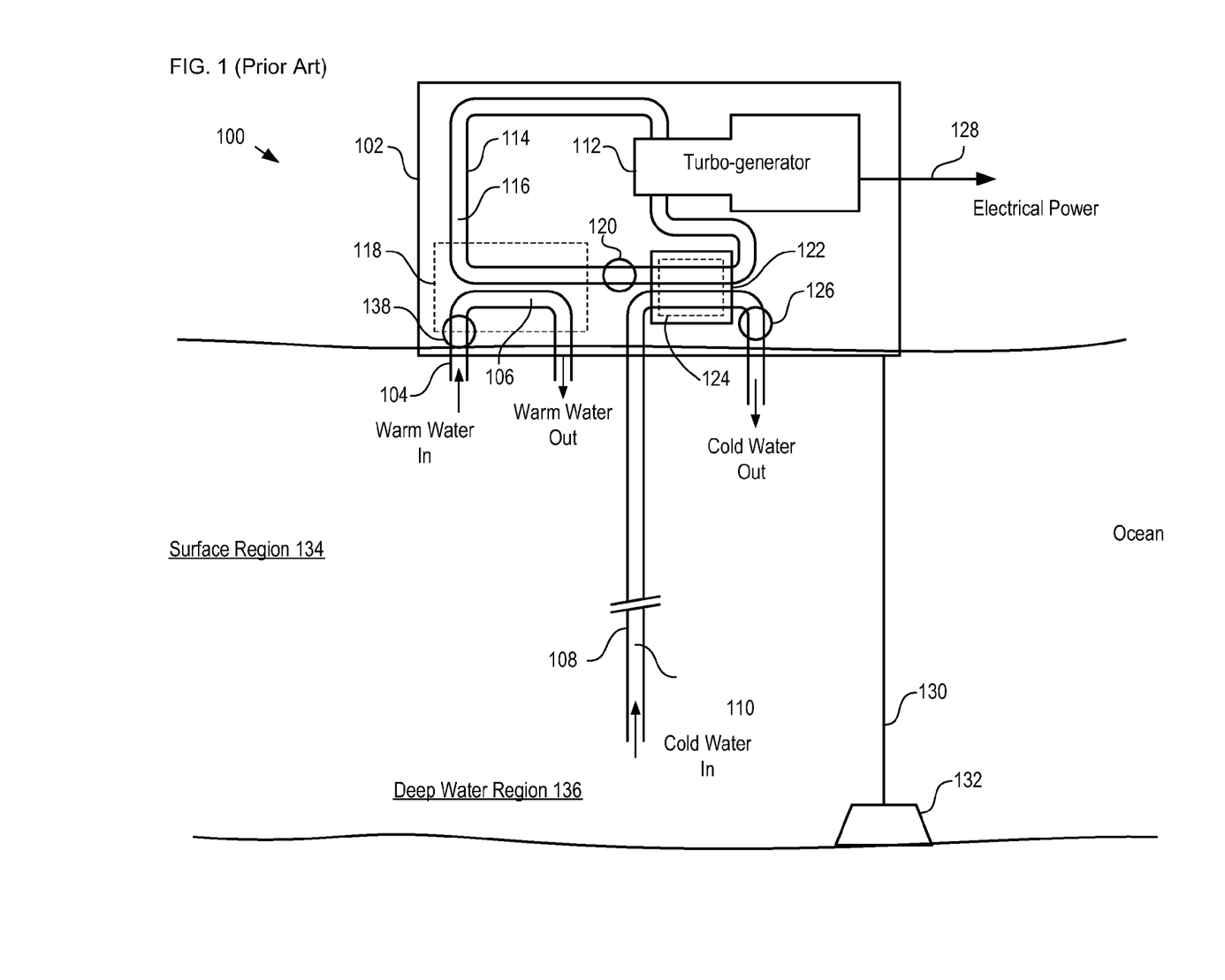
FIG. 1 depicts a schematic diagram of a portion of a typical OTEC power generation system in accordance with the prior art.

FIG. 1 depicts a schematic diagram of a portion of a typical OTEC power generation system in accordance with the prior art. OTEC system 100 comprises platform 102, surface water conduit 104, deep water conduit 108, turbogenerator 112, closed-loop conduit 114, heat exchanger 118, pump 120, and condenser 122.

Platform 102 is a conventional floating energy-plant platform. Platform 102 is anchored to the ocean floor by mooring line 130, which is connected to anchor 132. Anchor 132 is embedded in the ocean floor. In some instances, platform 102 is unanchored to the ocean floor and platform 102 is allowed to drift, such as in what is commonly referred to as a "grazing plant."

Surface water conduit 104 is a large-diameter pipe suitable for drawing water from surface region 134 into heat exchanger 118.

Closed-loop conduit 114 is a closed-circuit loop of pipe that contains a working fluid 116, such as ammonia. It should be noted that ammonia is only one potential working fluid, and one skilled in the art will recognize that other fluids can be used as working fluid 114. Typically it is desirable that working fluid 114 have a large change in vapor pressure between the temperature of the water at the surface region and the temperature of the water at the deep water region. Other considerations for the selection of a suitable working fluid include corrosiveness, thermal capacity, thermal conductivity, median pressure, and environmental hazard.

Closed-loop conduit 114 and surface water conduit 104 are thermally coupled at heat exchanger 118. As a result, working fluid 116 and surface water 106 are also thermally coupled at heat exchanger 118. This enables the heat of surface water 106 to vaporize the working fluid 116. The expanding vapor turns turbogenerator 112, which generates electrical energy and provides it on output cable 128.

After passing through turbogenerator 112, the vapor is conveyed to condenser 122, which comprises heat exchanger 124. At heat exchanger 124, closed-loop conduit 114 and deep water conduit 108 are thermally coupled, which enables the thermal coupling of the vaporized working fluid 116 and cold water 110. Cold water 110 is drawn from deep water region 136 by pump 126. Typically deep water region 136 is 1000+ meters below the surface of the body of water. Water at this depth is at a substantially constant temperature of a few degrees centigrade.

Cold water 110 acts as a heat sink for vaporized working fluid 116 at heat exchanger 124. As a result, the hot vaporized working fluid 116 is cooled by cold water 110 and condenses back into its liquid state, which is pumped through deep water conduit 108. Once it is condensed, pump 120 recycles working fluid 116 back into heat exchanger 118 where it is vaporized again to continue the cycle that powers turbogenerator 112.

There are several drawbacks to conventional OTEC systems, such as OTEC system 100. First, it is difficult and energy intensive to pump cold water up from depths of 1000+ meters. This challenge is further exacerbated by the fact that cold water is more dense than warm water, which increases the energy required to draw it up to the surface. This significantly reduces the benefits of using an OTEC approach for power generation.

Second, deep water conduit 108 is typically at least 10 meters in diameter and 1000+ meters long. Such a conduit is difficult and expensive to manufacture.

Third, the size and length of deep water conduits makes them susceptible to damage from environmental conditions, such as strong currents, storms, and wave action. As a result, complicated and expensive infrastructure is required to protect these conduits from damage. For example, numerous recent efforts have been made to improve the reliability of cold water pipes. These include the development of flexible pipes, inflatable pipes, rigid pipes made from steel, plastics, and composites, and gimbal-mounted pipes. Even with such proposed innovations, long cold water pipes remain a significant reliability and cost issue.

Figure 2A:
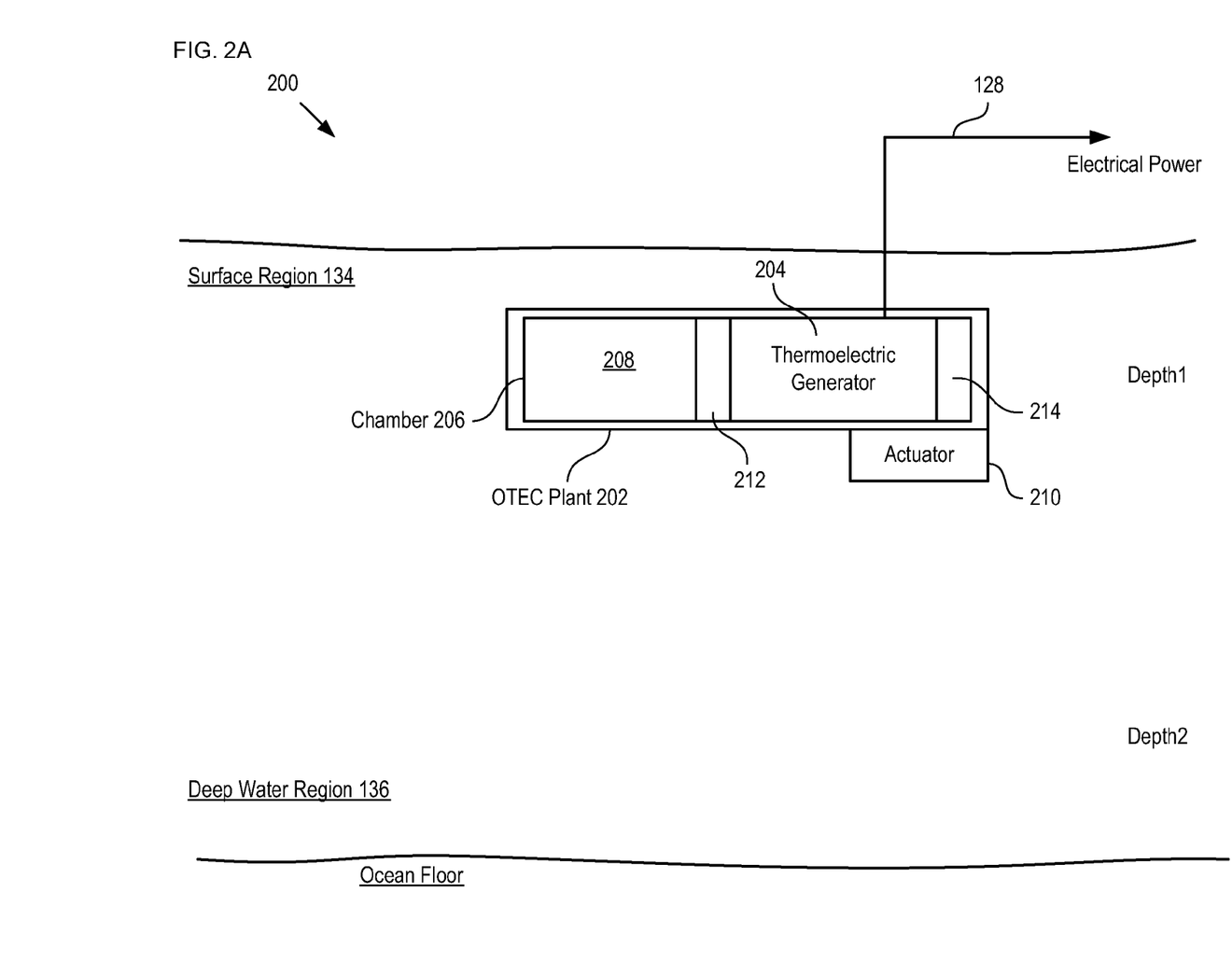
FIG. 2A depicts a schematic diagram of a portion of an OTEC power generation system, positioned at a first depth, in accordance with an illustrative embodiment of the present invention.
Figure 2B:
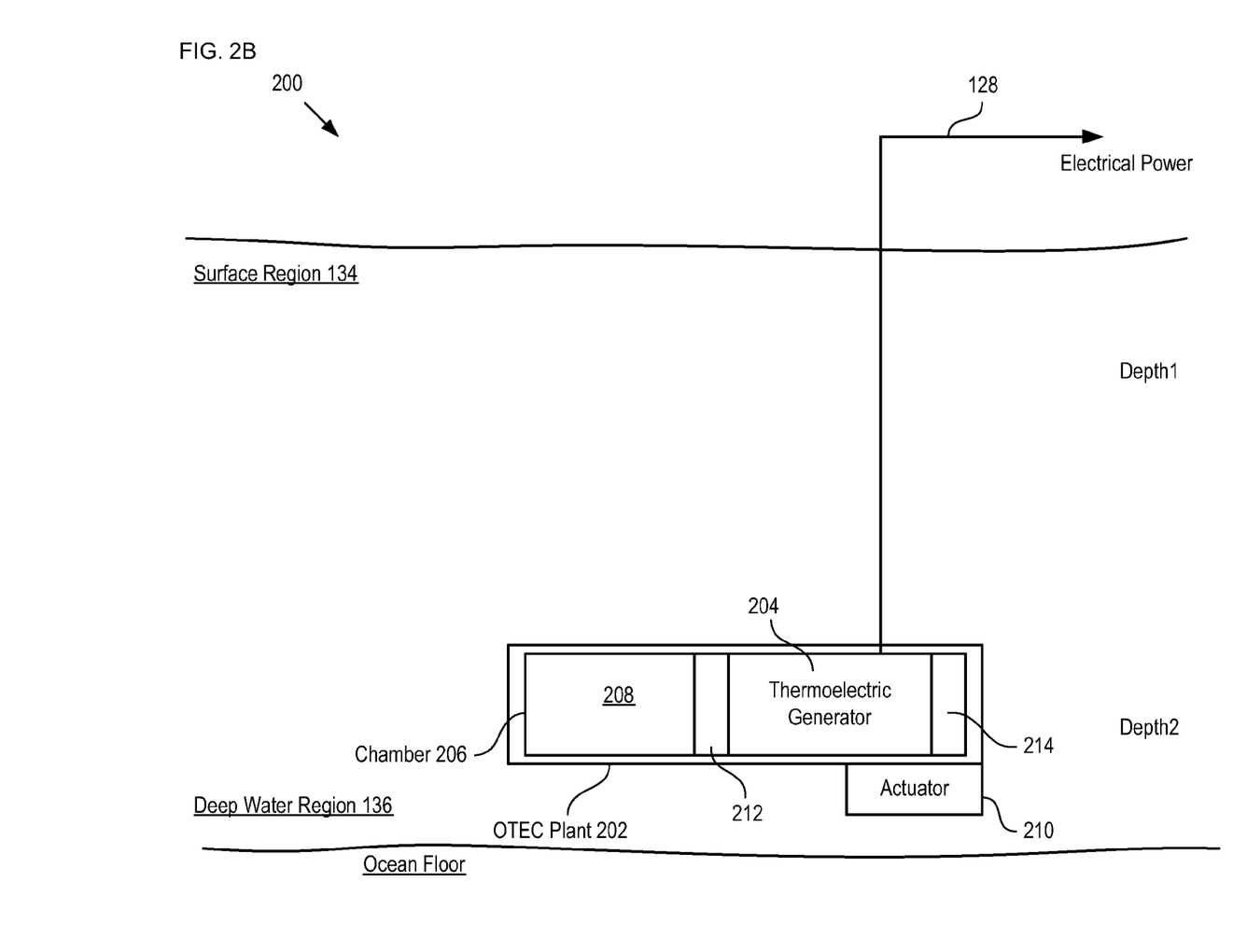
FIG. 2B depicts a schematic diagram of a portion of an OTEC power generation system, positioned at a second depth, in accordance with an illustrative embodiment of the present invention.

FIGS. 2A and 2B depict schematic diagrams of a portion of an OTEC power generation system, positioned at a first and second depth, respectively, in accordance with an illustrative embodiment of the present invention. OTEC system 200 comprises OTEC plant 202, electrical generation system 204, chamber 206, thermal mass 208, actuator 210, and heat exchangers 212 and 214.

OTEC system 200 is a substantially self-contained OTEC power generation system that can cycle between two depths of a body of water, simultaneously transporting, in bulk, a thermal mass between the two depths. The two depths are chosen based upon the temperature differential between them. When the OTEC system is moved from the first depth to the second depth, since the thermal mass is transported from the first depth, its temperature is based on the temperature of the water at the first depth. In similar fashion, when the OTEC system is moved from the second depth to the first depth, since the thermal mass is transported from the second depth, its temperature is based on the temperature of the water at the second depth. At each depth, OTEC system 200 generates electrical energy based on a temperature difference between the thermal mass and water local to OTEC plant 202. For example, at depth1, OTEC system 200 generates electric energy based on the difference between the temperature of the water at depth1 and the temperature of thermal mass 208, which is based on the temperature of depth2.

In some embodiments, OTEC system 200 comprises two or more OTEC plants so that, while one OTEC plant is in transit between depths, one or more others can be generating electrical energy. In such embodiments, therefore, the OTEC system can generate electrical energy on a substantially continuous basis.

OTEC plant 202 is a submersible structure that comprises electrical generation system 204 and chamber 206, which contains thermal mass 208. The submersible structure is designed to withstand the temperatures and pressures associated within a range of depths from approximately depth1 to approximately depth2. In some embodiments, OTEC plant 202 includes pressurized areas suitable for human habitation, ballast chambers, buoyancy control systems, and the like.

Electrical generation system 204 is an electrical power generator that generates electrical energy based on a temperature differential. Electrical generation system 204 provides the generated electrical energy on output cable 128. In the illustrative embodiment, electrical generation system 204 comprises a Rankine-cycle engine and a turbogenerator. In some embodiments, electrical generation system 204 comprises a solid-state thermoelectric device, such as a bismuth-telluride thermoelectric element, that generates an open-circuit voltage in response to a thermal gradient placed across it. Commercial examples of such thermoelectric elements include HZ modules available from Hi-Z Technology, Inc. In some embodiments, electrical generation system 204 comprises a solid-state thermoelectric device that generates electrical energy based on the Peltier effect.

In some embodiments, OTEC plant 202 comprises storage batteries for receiving the electrical energy generated by electrical generation system 204. In some embodiments, these storage batteries eliminated the need for output cable to extend into deep water region 136. Instead, the storage batteries can be connected with a power transmission system to offload generated electrical energy when OTEC plant 202 has been moved to depth1.

Chamber 206 is a thermally insulated container that is suitable for the bulk transport of thermal mass 208 between depth1 and depth2. In some embodiments, chamber 206 has a volume capacity within the range of approximately 100,000 cubic meters ($m^3$) and 2,000,000 $m^3$. For the purposes of this specification, including the appended claims, the term "chamber" means a container comprising a substantially enclosed volume for holding a thermal mass. It should be noted that the term chamber, as used herein, excludes meanings that would encompass tubes, conduits, pipes, and the like.

As discussed below, and with reference to FIGS. 3, 4A, and 4B, thermal mass 208 is a clathrate compound comprising propane. Thermal mass 208 is characterized by a freezing point that is higher than the temperature of the water at depth2.

Clathrate compounds are well-known substances in which one chemical can be trapped and held within a lattice of another type of chemical. The heat capacity of a clathrate compound can be as high as 80-100 times that of a comparable volume of water. The material properties of a clathrate compound are dependent upon the specific types of chemical used, as well as the ratio of the chemicals. As a result, a clathrate compound having a desired freezing point can readily be formed by one skilled in the art. Suitable materials for use in forming thermal mass 208 include, without limitation, propane, methane, ethane, other light hydrocarbons, hydrocarbon mixtures, anti-freeze compounds, and the like.

It should be noted that the clathrate compound of thermal mass 208 is characterized by an equilibrium vapor pressure for its propane constituent. The equilibrium vapor pressure of the propane is the pressure exerted by the propane vapor when it is in equilibrium with the clathrate compound at a given temperature. In other words, for any given temperature, the equilibrium vapor pressure is the minimum pressure required to keep the propane from boiling out of the clathrate compound.

As OTEC plant 202 approaches surface region 134, the temperature of the environment surrounding the clathrate compound increases and the pressure exerted on chamber 206 decreases. As a result, in some cases, hydrostatic pressure is not sufficient to ensure that the propane does not boil out of the clathrate compound. In some embodiments, therefore, chamber 206 must be pressurized to a pressure greater than the equilibrium vapor pressure of the propane to maintain the composition of the clathrate compound.

Actuator 210 moves OTEC plant 202 between depth1 and depth2. Suitable actuators include mooring line tractor engines, motors, hoists, lanyards, self-propulsion systems, buoyancy chambers and the like. In some embodiments, OTEC plant 202 is self-propelled in analogous fashion to a self-propelled submersible vessel, such as a submarine. In some embodiments, the use of a clathrate compound as thermal mass 208 obviates the need for actuator 210, since a clathrate compound can be formed that is more buoyant as it freezes. In such embodiments, therefore, OTEC plant 202 can be designed to have positively buoyancy when thermal mass 208 reaches a desired frozen state at depth2 and negative buoyancy when the temperature of thermal mass 208 reaches a temperature close to that of the water at depth1.

In some embodiments, thermal mass 208 comprises a "phase-change material" other than a clathrate compound. For the purposes of this Specification, included the appended claims, a phase change material is a material that freezes at a temperature equal to or higher than that of the water at depth2.

Heat exchanger 212 is a heat exchanger that thermally couples electrical generation system 204 and thermal mass 208. Heat exchanger 212 is physically adapted to operate over a depth range from surface region 134 to deep water region 136. In some embodiments, the depth range from surface region 134 to deep water region 136 can exceed 1000 meters.

Heat exchanger 214 is a heat exchanger that thermally couples electrical generation system 204 and thermal mass 208. Heat exchanger 214 is physically adapted to operate over a depth range from surface region 134 to deep water region 136.

Embodiments of the present invention derive several advantages over the prior art. First, due to the bulk transport of the thermal mass between the two depths, the present invention obviates the need for deep water conduit 108; therefore, embodiments of the present invention avoid some or all of the drawbacks described above and with respect to FIG. 1. As a result, embodiments of the present invention can exhibit higher reliability and improved energy efficiency over conventional OTEC systems.

Second, during periods of adverse weather conditions (e.g., hurricanes, tropical storms, storm surge, etc.), embodiments of the present invention can be submerged to a depth adequate to protect the OTEC system from damage. Such embodiments, therefore, reduce or eliminate the need for complex and costly infrastructure that is required by surface-based energy platforms to enable them to withstand storm conditions.

Third, embodiments of the present invention comprise OTEC systems that are substantially self-contained. Such systems, therefore, can be brought to the surface and towed to a repair facility for maintenance, upgrade, and/or refurbishment.

Fourth, a submersible OTEC system would have reduced visual impact as compared to a conventional ocean-based power generation plant. As a result, construction and operation of an OTEC system in accordance with the present invention could engender less political resistance than typically surrounds the deployment of a conventional OTEC plant.

Figure 3:
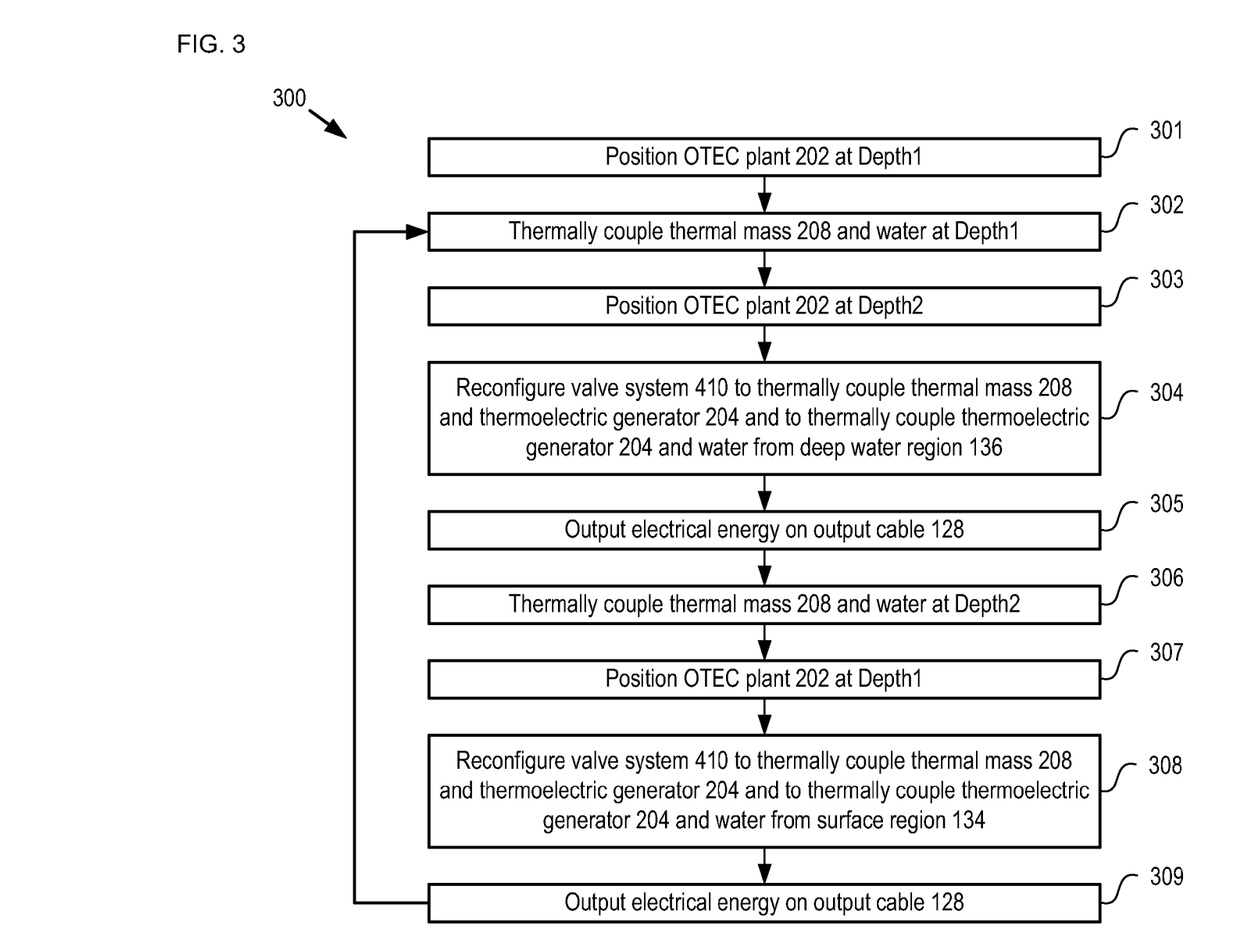
FIG. 3 depicts operations of a method suitable for generating electrical energy in accordance with the illustrative embodiment of the present invention.

FIG. 3 depicts operations of a method suitable for generating electrical energy in accordance with the illustrative embodiment of the present invention. FIG. 3 is described herein with continuing reference to FIGS. 2A and 2B, and with reference to FIGS. 4A, 4B, and 5A. Method 300 begins with operation 301, wherein OTEC plant 202 is positioned at depth1.

Figure 4A:
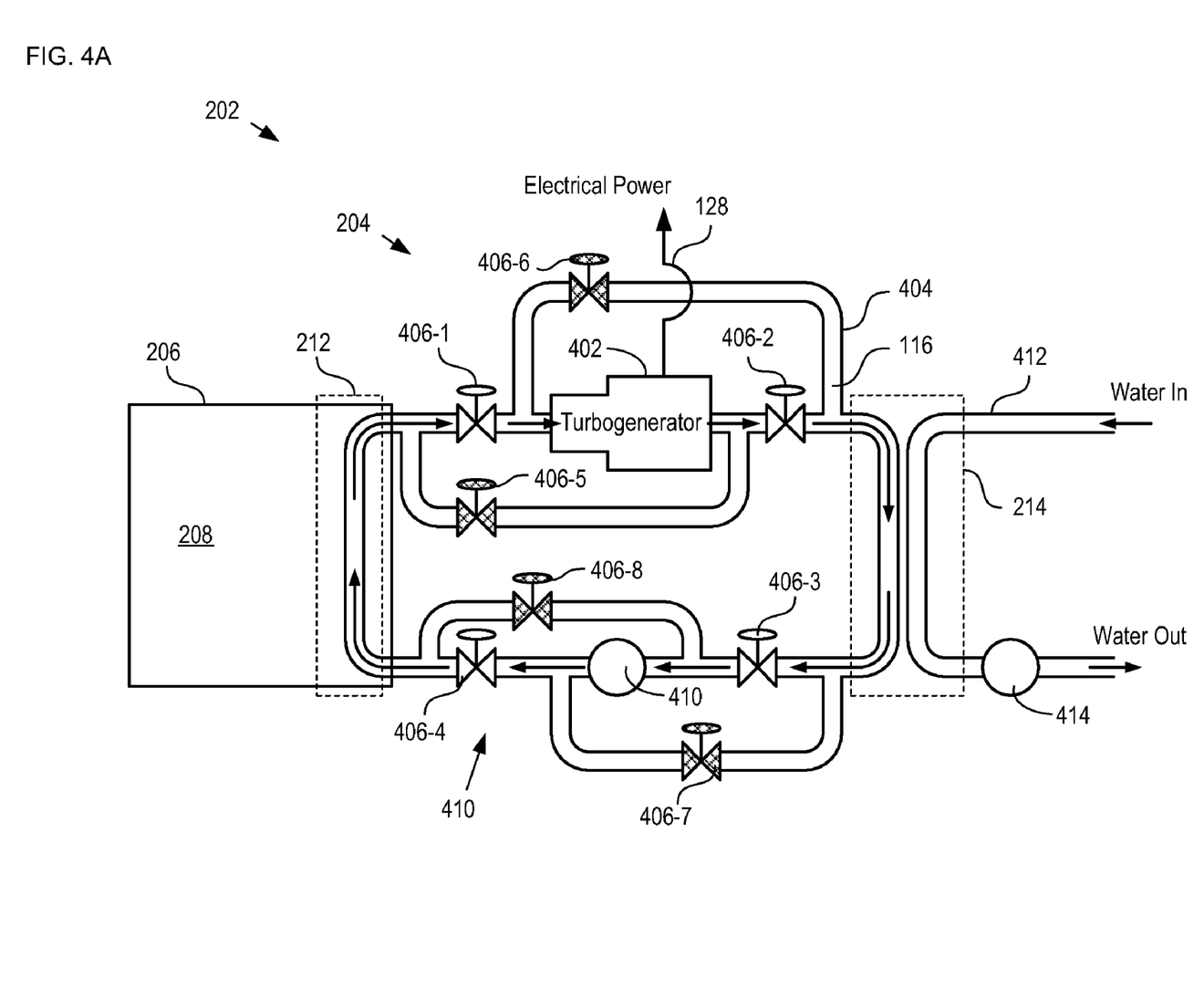
FIG. 4A depicts a schematic diagram of a portion of OTEC plant 202, in operation at depth2, in accordance with the illustrative embodiment of the present invention.
Figure 4B:
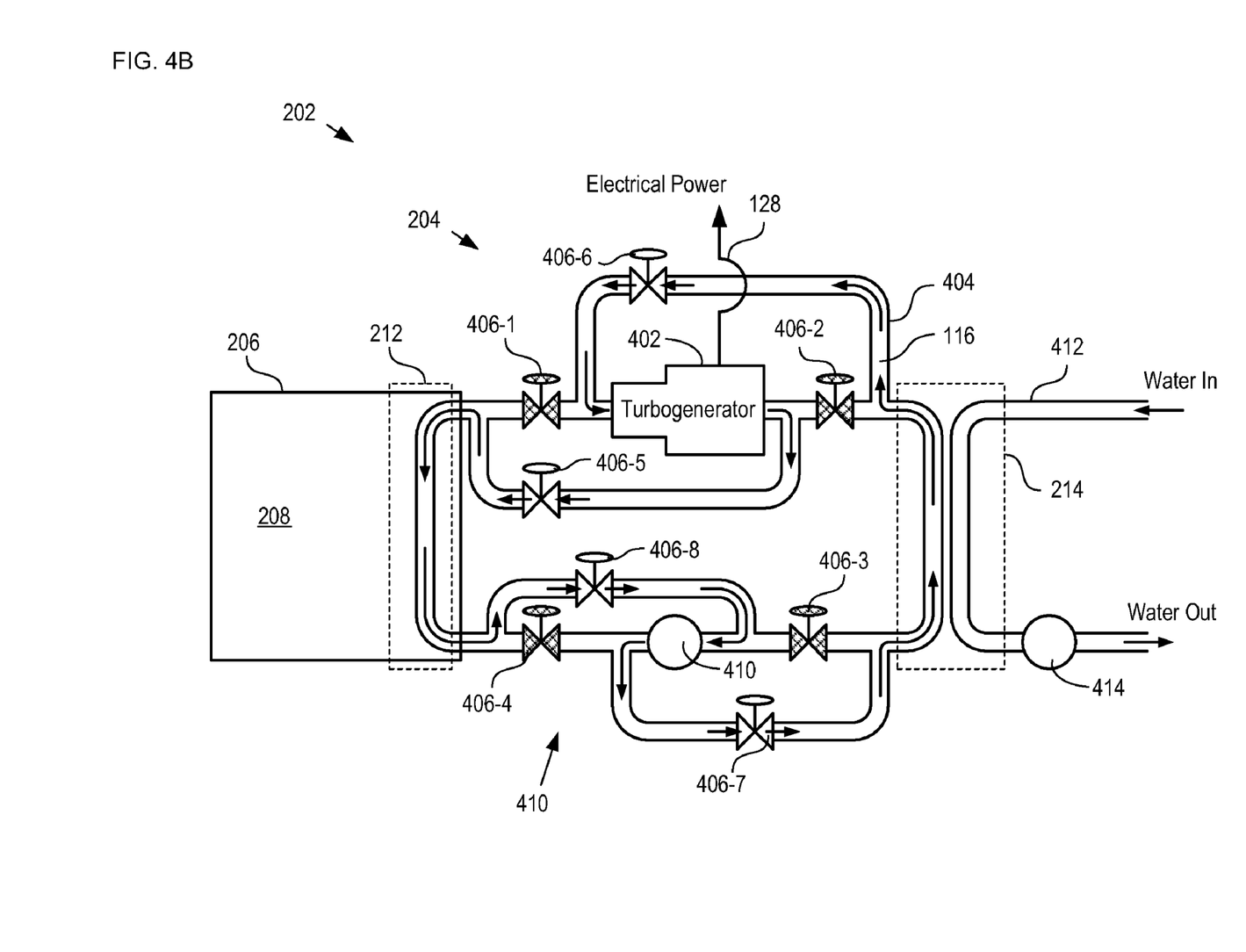
FIG. 4B depicts a schematic diagram of a portion of OTEC plant 202, in operation at depth1, in accordance with the illustrative embodiment of the present invention.

FIGS. 4A and 4B depict schematic diagrams of a portion of OTEC plant 202, in operation at depth2 and depth1, respectively, in accordance with the illustrative embodiment of the present invention.

FIG. 4A depicts OTEC plant 202 wherein electrical generation system 204 is in a configuration suitable for operation in which the temperature of thermal mass 208 is higher than the temperature of water that flows through water conduit 412. This thermal condition can occur when OTEC plant 202 is positioned at depth2, for example. Electrical generation system 204 is a Rankine-cycle engine that comprises turbogenerator 402, conduit 404, working fluid 116, valves 406-1 through 406-8, and pump 410. Valves 406-1 through 406-8 collectively define valve system 410.

FIG. 4B depicts OTEC plant 202 wherein electrical generation system 204 is in a configuration suitable for operation in which the temperature of thermal mass 208 is lower than the temperature of water that flows through water conduit 412. This thermal condition can occur when OTEC plant 202 is positioned at depth1.

Figure 5A:
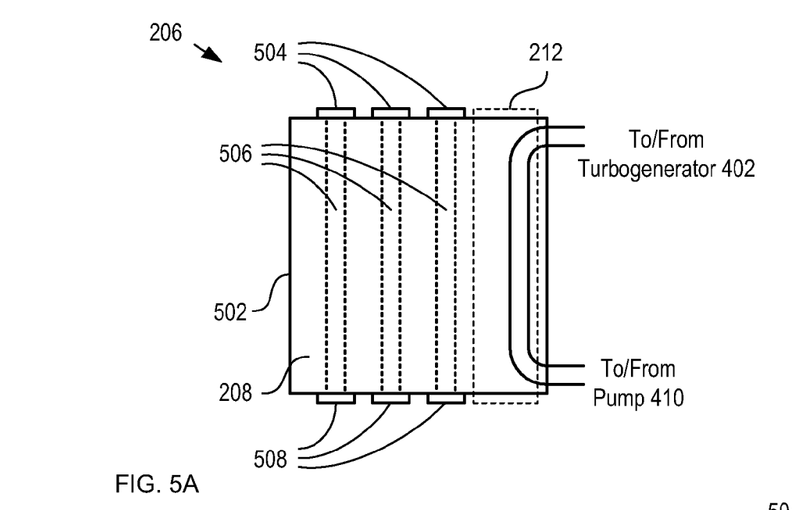
FIG. 5A depicts a schematic diagram of a portion of chamber 206 in accordance with the illustrative embodiment of the present invention.

FIG. 5A depicts a schematic diagram of a portion of chamber 206 in accordance with the illustrative embodiment of the present invention.

At operation 302, thermal mass 208 and warm water from surface region 134 are thermally coupled by opening valves 504 and 508. This enables water at depth1 to flow through conduits 506. Valves 504 and 508 and conduits 506 collectively define a heat exchanger that facilitates the thermal coupling between thermal mass 208 and water at the depth at which chamber 206 is positioned. In some embodiments, small pumps are used to force water through conduits 506 to facilitate the thermal coupling of thermal mass 208 and the water. By virtue of this thermal coupling, heat from the water at depth1 warms thermal mass 208 to bring its temperature to a first desired temperature. Once thermal mass 208 is at its desired temperature, valves 504 and 508 are closed to substantially insulate thermal mass 208 from its surrounding environment. It should be noted that valves 504 and 508 are only one of several elements suitable for impeding or enabling the flow of water through conduits 506. Suitable elements for use in valves 504 and 508 include, without limitation, valves, doors, flappers, butterfly valves, needle valves, and the like. It will be clear to one skilled in the art, after reading this specification, how to specify, make, and use, valves 504 and 508.

At operation 303, actuator 210 moves OTEC plant 202 to depth2.

At operation 304, valve system 410 is reconfigured by opening valves 406-1 through 406-4 and closing valves 406-5 through 406-8. This valve reconfiguration enables electrical generation system 204 to generate electrical energy while at depth2. This valve system configuration enables the flow of working fluid 116 through conduit 404 and turbogenerator 402 as depicted in FIG. 4A. As a result of this flow of working fluid 116: (1) thermal mass 208 and electrical generation system 204 are thermally coupled at heat exchanger 212; and (2) electrical generation system 204 and cold water from deep water region 136 are thermally coupled at heat exchanger 214. The cold water from deep water region 136 includes water from depth2. Thermal mass 208 and electrical generation system 204 are thermally coupled via working fluid 116, which is pumped through conduit 404 by pump 410. The water is pumped through water conduit 412 by pump 414, which is adapted for operation at both depth1 and depth2.

At operation 305, turbogenerator 402 generates electrical energy, which is output on output cable 136. Turbogenerator 402 is driven by vaporized working fluid 116, which is vaporized at heat exchanger 212 due to heat provided by thermal mass 208.

After passing through turbogenerator 402, the vaporized working fluid is condensed at heat exchanger 214 where it is thermally coupled with water from deep water region 136.

At operation 306, thermal mass 208 and cold water from deep water region 136 are thermally coupled by opening valves 504 and 508. This enables water at depth2 to flow through conduits 506. As a result, the water at depth2 cools thermal mass 208 to induce thermal mass 208 to begin to freeze. Once a desired fraction of thermal mass 208 is frozen, valves 504 and 508 are closed to substantially insulate thermal mass 208 from its surrounding environment.

At operation 307, OTEC plant 202 is moved to depth1 by actuator 210. This typically occurs once the temperature of thermal mass 208 is no longer sufficiently different from the water in deep water region 136 to enable a desired rate of electrical energy generation. In some embodiments, actuator 210 is not necessary to move OTEC plant 202 between depth1 and depth2. In some embodiments, thermal mass 208 becomes sufficiently positively buoyant when cooled and sufficiently negatively buoyant when heated that this buoyancy is all that is required to move OTEC plant 202 between the depths.

At operation 308, valve system 410 is reconfigured by closing valves 406-1 through 406-4 and opening valves 406-5 through 406-8. This valve reconfiguration enables electrical generation system 204 to generate electrical energy while at depth1. This valve system configuration enables the flow of working fluid 116 through conduit 404 and turbogenerator 402 as depicted in FIG. 4B. As a result of this flow of working fluid 116: (1) thermal mass 208 and electrical generation system 204 are thermally coupled at heat exchanger 212; and (2) electrical generation system 204 and warm water from surface region 134 are thermally coupled at heat exchanger 214. The warm water from surface region 134 includes water from depth1.

At operation 309, turbogenerator 402 generates electrical energy, which is output on output cable 136. Turbogenerator 402 is driven by vaporized working fluid 116, which is vaporized at heat exchanger 214 due to heat provided by water from depth1.

After passing through turbogenerator 402, the vaporized working fluid is condensed at heat exchanger 212 where it is thermally coupled with thermal mass 208.

Once the temperature of thermal mass 208 is no longer sufficiently different from the water in surface region 134 to enable a desired rate of electrical energy generation, method 300 continues by returning to operation 302.

Figure 5B:
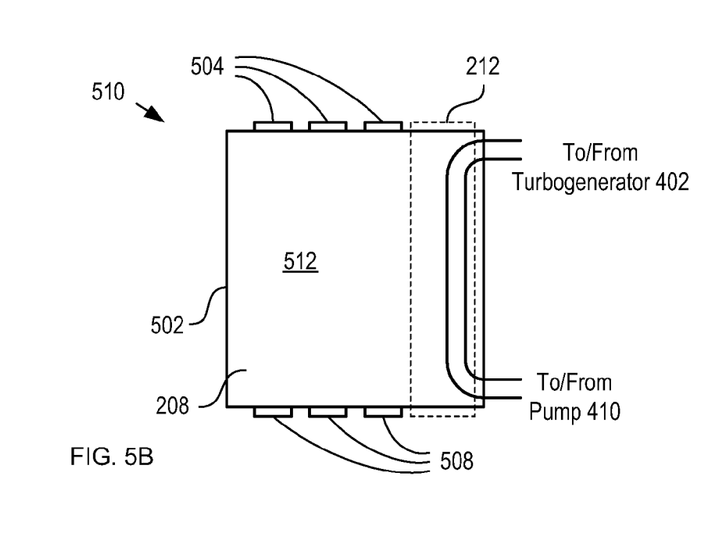
FIG. 5B depicts a schematic diagram of a portion of a chamber in accordance with an alternative embodiment of the present invention.

FIG. 5B depicts a schematic diagram of a portion of a chamber in accordance with an alternative embodiment of the present invention. Chamber 510 is analogous to chamber 206; however chamber 510 holds thermal mass 512, which is a volume of water transferred into it at depth1 or depth2. As for chamber 206, working fluid 116 in conduit 404 is thermally coupled with thermal mass 512 at heat exchanger 212. In some embodiments, water of thermal mass 512 is pumped from chamber 510 into heat exchanger 212, where it is thermally coupled with working fluid 116.

Chamber 510 is filled with water from its local depth by opening valves 504 and 506. In some embodiments, small pumps are included in chamber 510 to force water into and out of chamber 510. Once chamber 510 is filled with thermal mass 512, valves 504 and 506 are closed to substantially thermally insulate thermal mass 512 from the environment surrounding chamber 510.

Figure 6:
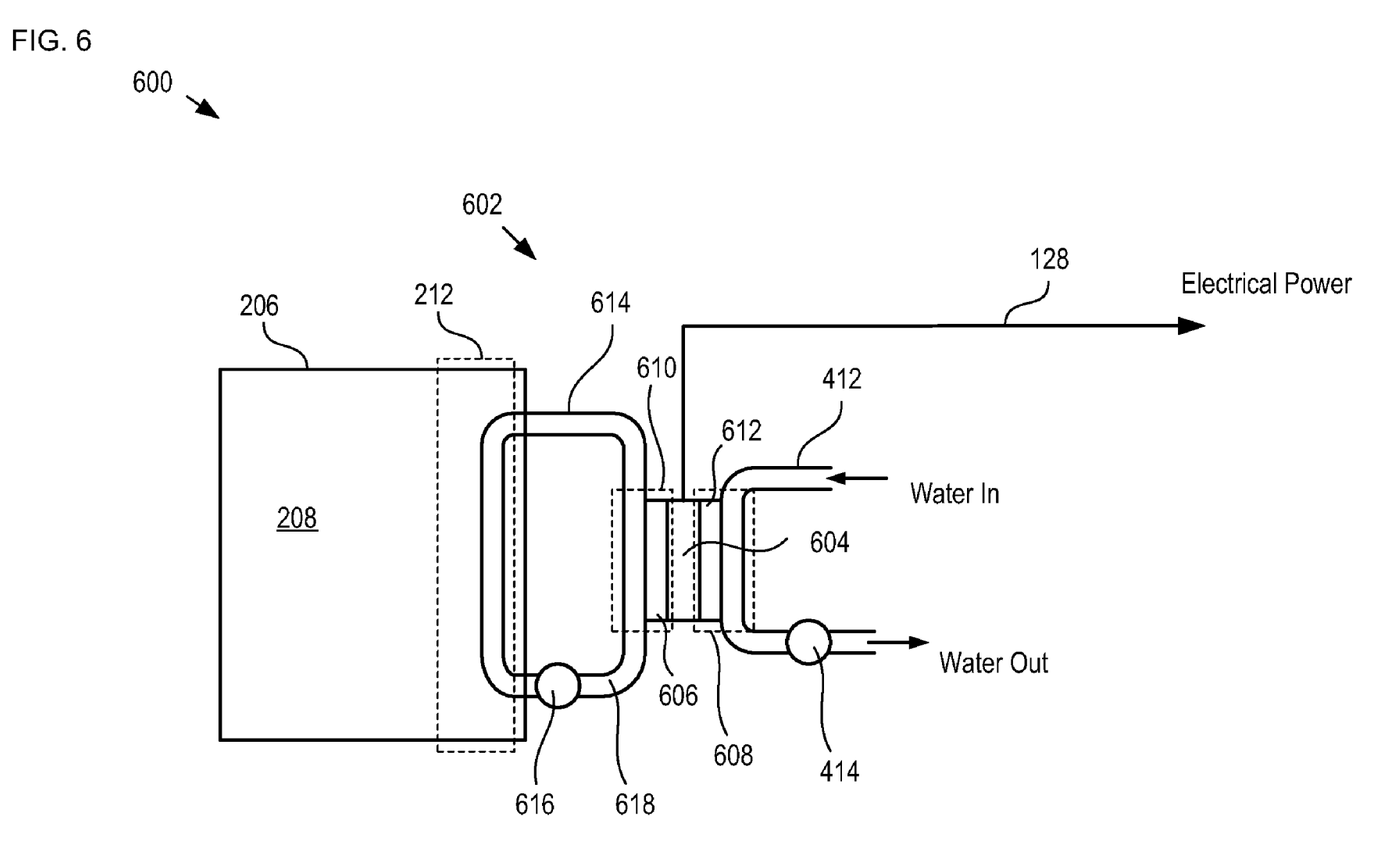
FIG. 6 depicts a schematic diagram of a portion of an OTEC plant in accordance with an alternative embodiment of the present invention.

FIG. 6 depicts a schematic diagram of a portion of an OTEC plant in accordance with an alternative embodiment of the present invention. OTEC plant 600 comprises electrical generation system 602, heat exchanger 212, chamber 206, thermal mass 208, water conduit 412, and pump 414.

Electrical generation system 602 is a system for generating electrical energy based on a temperature differential across a solid-state thermoelectric element. Electrical generation system 602 comprises solid-state thermoelectric element 604, conduit 614, conduit pump 616, fluid 618, and heat exchangers 610 and 612.

Thermoelectric element 604 is a solid-state thermoelectric device that comprises a bismuth-telluride alloy. Thermoelectric element 604 generates an open-circuit voltage in response to a thermal gradient placed across it. Commercial examples of thermoelectric element 604 include HZ modules available from Hi-Z Technology, Inc. In some embodiments, thermoelectric element 604 comprises a thermoelectric material other than bismuth-telluride. Thermoelectric materials suitable for use in thermoelectric element 604 include, without limitation, traditional thermocouple materials, quantum well materials (e.g silicon-silicon germanium and semi-conducting silicon carbide) In some embodiments, thermoelectric element 604 is a solid-state element that generates electrical energy by means of the Peltier effect.

In operation, pump 414 draws water from the body of water and pumps it through water conduit 412. Water conduit 412 is thermally coupled with plate 612, which is thermally coupled with one surface of thermoelectric element 604.

Water conduit 412 and plate 612 collectively define heat exchanger 608. At heat exchanger 608, plate 612 is brought to a temperature based on the temperature of the water flowing through water conduit 412.

In similar fashion, conduit pump 616 pumps fluid 618 through conduit 614, thereby circulating fluid 618 through both heat exchanger 212 and heat exchanger 610. At heat exchanger 610, fluid 618 is thermally coupled with plate 606, which is thermally coupled with solid-state thermoelectric element 604. At heat exchanger 212, fluid 618 is thermally coupled with thermal mass 208. As a result, the temperature of plate 606 is brought to a temperature based on the temperature of thermal mass 208.

By virtue of the temperature differential between thermal mass 208 and the water flowing through water conduit 412, thermoelectric element 604 generates electrical energy and provides it on output cable 128.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. An apparatus comprising:
  a generator, wherein the generator generates electrical energy based on a temperature difference between a first thermal mass and a second thermal mass;
  the first thermal mass, wherein the temperature of the first thermal mass is based on the temperature of water at a first depth of a body of water;
  the second thermal mass, wherein the temperature of the second thermal mass is based on the temperature of water at a second depth of the body of water;
  a first heat exchanger, wherein the first heat exchanger is thermally coupled to the first thermal mass;
  a second heat exchanger, and wherein the second heat exchanger is thermally coupled to the second thermal mass; and
  a chamber, wherein the chamber contains the second thermal mass;
  wherein each of the chamber and the generator are movable between the first depth and the second depth, and wherein the generator comprises a first physical adaptation that enables the generator to operate at each of the first depth and the second depth, and further wherein the generator generates electrical energy based on a temperature difference between the first heat exchanger and the second heat exchanger.

2. The apparatus of claim 1 wherein the generator comprises a second physical adaptation that enables the generator to generate electrical energy when the temperature difference is both positive and negative.

3. The apparatus of claim 1 further comprising a submersible structure, wherein the submersible structure comprises the chamber and the generator.

4. The apparatus of claim 1 wherein the first heat exchanger and the second heat exchanger are suitable for operation at a depth equal to or greater than 1000 meters.

5. The apparatus of claim 1 wherein the first heat exchanger and the second heat exchanger are suitable for operation at each of the first depth and the second depth.

6. The apparatus of claim 1 further comprising an actuator, wherein the actuator moves the chamber and the generator between the first depth and the second depth.

7. The apparatus of claim 1 wherein at least one of the first thermal mass and the second thermal mass comprises a phase-change material.

8. The apparatus of claim 7 wherein the phase-change material is a clathrate compound.

9. An apparatus comprising an OTEC plant, wherein the OTEC plant comprises:
(1) a first heat exchanger whose temperature is based on the temperature of water at a first depth of a body of water;
(2) a second heat exchanger whose temperature is based on the temperature of a thermal mass, wherein the temperature of the thermal mass is based on the temperature of water at a second depth of the body of water; and
(3) a electrical generation system, wherein the electrical generation system generates electrical energy based on a difference between the temperature of the first heat exchanger and the temperature of the second heat exchanger;
wherein the OTEC plant is movable between the first depth and the second depth; and
wherein the OTEC plant comprises a first physical adaptation that enables the electrical generation system to generate electrical energy when the OTEC plant is at each of the first depth and the second depth.

10. The apparatus of claim 9, wherein the OTEC plant comprises a chamber that contains the thermal mass.

11. The apparatus of claim 10 wherein the thermal mass comprises a phase-change material.

12. The apparatus of claim 11 wherein the phase-change material is a clathrate compound.

13. The apparatus of claim 10 wherein the thermal mass comprises water from a region of the body of water, and wherein the region comprises the second depth.

14. The apparatus of claim 9 further comprising a conduit, wherein the conduit conveys a working fluid:
wherein the turbogenerator comprising an input for receiving working fluid from the conduit and an output for providing working fluid to the conduit;
wherein the first physical adaptation is a valve system;
wherein the valve system fluidically couples the first heat exchanger and the input and fluidically couples the second heat exchanger and the output when the OTEC plant is at the first depth; and
wherein the valve system fluidically couples the second heat exchanger and the input and fluidically couples the first heat exchanger and the output when the OTEC plant is at the second depth.

15. The apparatus of claim 9 further comprising an actuator, wherein the actuator moves the OTEC plant between the first depth and the second depth.

16. The apparatus of claim 9 wherein the electrical generation system comprises a solid-state thermoelectric element.

17. The apparatus of claim 9 further comprising a housing, wherein the housing encloses the electrical generation system, and wherein the housing is physically adapted to withstand the pressure at each of the first depth and the second depth.

18. A method for generating electrical energy comprising:
providing an OTEC plant, wherein the OTEC plant comprises a electrical generation system and a chamber for containing a first thermal mass;
positioning the OTEC plant at a first depth of a body of water;
establishing a first temperature for the first thermal mass, wherein the first temperature is based on the temperature of the water at the first depth;
moving the first thermal mass to a second depth of the body of water;
thermally coupling the electrical generation system and the first thermal mass;
thermally coupling the electrical generation system and a second thermal mass, wherein the second thermal mass has a second temperature that is based on the temperature of water at the second depth;
generating electrical energy based on a difference between the first temperature and the second temperature.

19. The method of claim 18 wherein the first temperature is established by operations comprising:
providing the first thermal mass, wherein the first thermal mass is provided as a phase-change material; and
holding the first thermal mass at the first depth for a time sufficient for a desired portion of the first thermal mass to freeze.

20. The method of claim 18 wherein the first temperature is established by filling the chamber with water from a region of the body of water to provide the first thermal mass, wherein the region comprises the first depth.

21. The method of claim 20 wherein the electrical generation system and the first thermal mass are thermally coupled by conveying water from the chamber to a first heat exchanger, wherein the first heat exchanger and the electrical generation system are thermally coupled.

22. The method of claim 18 wherein the electrical generation system and the second thermal mass are coupled by operations comprising:
conveying water from a region of the body of water to a heat exchanger, wherein the region comprises the second depth; and
thermally coupling the heat exchanger and the electrical generation system.

23. The method of claim 18 further comprising protecting the electrical generation system in a housing, wherein the housing is physically adapted to withstand the pressure at each of the first depth and the second depth.

24. The method of claim 18 further comprising:
thermally coupling a first heat exchanger and the first thermal mass;
thermally coupling a second heat exchanger and the second thermal mass;
conveying a working fluid between the electrical generation system and the first heat exchanger to thermally couple the electrical generation system and the first thermal mass; and
conveying the working fluid between the electrical generation system and the second heat exchanger to thermally couple the electrical generation system and the second thermal mass.

25. The method of claim 24 further comprising:
configuring a valve system in a first configuration when the OTEC plant is at the first depth;
wherein the first configuration enables working fluid to travel from the first heat exchanger to the electrical generation system; and
wherein the first configuration enables working fluid to travel from the electrical generation system to the second heat exchanger; and configuring a valve system in a second configuration when the OTEC plant is at the second depth;
wherein the second configuration enables working fluid to travel from the second heat exchanger to the electrical generation system; and
wherein the second configuration enables working fluid to travel from the electrical generation system to the first heat exchanger.

* * * * *